(12) United States Patent
Okuda

(10) Patent No.: US 6,784,575 B2
(45) Date of Patent: Aug. 31, 2004

(54) AIR-COOLED OUTER ROTOR TYPE MOTOR/GENERATOR CONTAINED WITHIN A CRANK PULLEY OF AN ENGINE

(75) Inventor: Kazuma Okuda, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 36 days.

(21) Appl. No.: 09/865,514

(22) Filed: May 29, 2001

(65) Prior Publication Data

US 2002/0053838 A1 May 9, 2002

(30) Foreign Application Priority Data

May 30, 2000 (JP) .................................... 2000-159740

(51) Int. Cl.[7] ............................. H02K 9/00; H02K 1/12
(52) U.S. Cl. ........................... 310/58; 310/254; 310/52; 310/179; 310/216; 310/208
(58) Field of Search ........................ 310/58, 52, 40 R, 310/10, 254, 259, 179, 208, 216, 261, 63, 621, 53, 60 R, 617 R, 194, 88, 67 R, 62, 60 A, 59

(56) References Cited

U.S. PATENT DOCUMENTS

| | | | | |
|---|---|---|---|---|
| 2,789,238 A | * | 4/1957 | Staak ........................... | 310/88 |
| 4,288,712 A | * | 9/1981 | Hagenlocher et al. ........ | 310/91 |
| 5,655,485 A | * | 8/1997 | Kusase et al. ............ | 123/41.31 |
| 5,742,107 A | * | 4/1998 | Asao et al. .................... | 310/62 |
| 5,905,318 A | * | 5/1999 | Faulhaber et al. ............ | 310/58 |
| 5,955,804 A | * | 9/1999 | Kusase et al. ................ | 310/59 |
| 6,384,494 B1 | * | 5/2002 | Avidano et al. ............... | 310/58 |
| 6,396,177 B1 | * | 5/2002 | Shin et al. .................... | 310/63 |
| 6,617,715 B1 | * | 9/2003 | Harris et al. .................. | 310/54 |

FOREIGN PATENT DOCUMENTS

| | | | | |
|---|---|---|---|---|
| JP | 359230448 | * | 12/1984 | ............ H02K/9/06 |
| JP | 04222436 | * | 8/1992 | ............ H02K/7/18 |
| JP | 02001339925 A | * | 5/2000 | .......... H02K/21/22 |

* cited by examiner

Primary Examiner—Burton S. Mullins
Assistant Examiner—Heba Elakssabgi
(74) Attorney, Agent, or Firm—Armstrong, Kratz, Quintos, Hanson & Brooks, LLP (57) ABSTRACT

A motor/generator housed in an annular space formed between an engine side wall and a crank pulley fixed to an end of a crank shaft includes a stator supported on the engine side wall and a rotor supported on the inner surface of a peripheral wall of the pulley. Air is introduced into the annular space via an air inlet passage by means of cooling fan blades formed on a side wall of the crank pulley, and coils are cooled by passing the air through air passages formed between adjacent coils. The entrance of an air gap between the stator and the rotor is shielded by means of shields provided on bobbins so as to prevent any foreign matter from entering the air gap.

4 Claims, 7 Drawing Sheets

AIR-COOLED OUTER ROTOR TYPE MOTOR/GENERATOR CONTAINED WITHIN A CRANK PULLEY OF AN ENGINE

BACKGROUND OF THE INVENTION

1. Field of the Invention

The present invention relates to an outer rotor type motor/generator housed in an annular space defined between an engine side wall and a crank pulley fixed to an end of a crankshaft, and comprises a stator supported on the engine side wall and a rotor supported on the inner face of the peripheral wall of the crank pulley so as to face the outer periphery of the stator across an air gap.

2. Description of the Related Art

Because the heat generated in a stator coil when a motor is operated adversely affects its durability, Japanese Patent Application Laid-open No. 10-322974 discloses an arrangement in which external air is forcibly introduced into the motor housing by means of a cooling fan provided on the rotating shaft of the motor so as to cool the heated stator coil. This kind of problem with heat generation is present not only in motors but also in generators.

Automobile starter motors are usually attached to the outside of the engine block, but if the starter motor is housed in an internal space of a crank pulley provided on a crankshaft, the overall size of the engine can be reduced and, moreover, the kinetic energy of the automobile body can be recovered as electrical energy from regenerative braking by making the starter motor function as a generator when operating an engine brake.

However, when the starter motor is housed inside the crank pulley provided on the crankshaft, it is necessary to take care to prevent foreign matter scattered from the road surface from being sucked inside the starter motor. If the starter motor is completely covered so as to prevent any foreign matter from being sucked in, the circulation of air inside the crank pulley deteriorates, thereby disadvantageously degrading the cooling performance of the starter motor.

SUMMARY OF THE INVENTION

The present invention has been carried out in view of the above-mentioned circumstances, and it is an object of the present invention to simultaneously satisfy both the requirement for preventing any foreign matter from being ingested and the requirement for cooling when a motor/generator is housed inside the crank pulley of an engine.

In order to achieve the above-mentioned object, there is proposed an outer rotor type motor/generator housed in an annular space defined between an engine side wall and a crank pulley fixed to an end of a crankshaft, and comprising a stator supported on the engine side wall and a rotor supported on the inner face of the peripheral wall of the crank pulley so as to face the outer periphery of the stator across an air gap, wherein an air inlet passage is formed between the engine side wall and the edge of the peripheral wall of the crank pulley so as to provide communication between the annular space and the outside of the crank pulley, and cooling fan blades provided on a side wall of the crank pulley extend radially outwards from one end of the crankshaft to the peripheral wall of the crank pulley, coils of the stator are cooled by the air introduced into the annular space via the air inlet passage and the air is discharged to the outside by means of the cooling fan blades.

In accordance with the above-mentioned arrangement, when the crankshaft rotates, the rotor supported on the crank pulley and the stator supported on the engine side wall rotate relative to each other, thereby exhibiting the function of one of a motor and a generator, and as a result the stator coils generate heat. When the cooling fan blades provided on the side wall of the crank pulley rotate along with the rotation of the crankshaft, air is introduced into the annular space via the air inlet passage formed between the engine side wall and the edge of the peripheral wall of the crank pulley, and the air cools the heated coils of the stator until it is discharged from the annular space to the outside of the crank pulley by means of the cooling fan blades. This allows the coils of the stator to be cooled effectively while housing the motor/generator in the annular space formed between the crank pulley and the engine side wall and preventing contamination and damage due to ingestion of foreign matter.

The above-mentioned stator may comprise a plurality of cores and coils, the cores being positioned radially and each of the cores having a coil wound around it, the radially outer ends of each of the cores projecting in the circumferential direction so as to be close to each other and forming air passages between adjacent coils, with air circulating through the air passages.

In accordance with the above-mentioned arrangement, because the radial outer ends of the stator cores project in the circumferential direction so as to be close to each other, it becomes more difficult for the air introduced into the annular space via the air inlet passage to enter the air gap between the stator and the rotor, and it is possible to prevent any foreign matter from being trapped in this air gap, thereby damaging the stator and the rotor. Moreover, because air passages through which air circulates are formed between adjacent coils, the coils can be cooled effectively by circulating air through the passages.

A shield for covering the entrance of the above-mentioned air gap may be formed on an end face of the stator facing the above-mentioned air inlet passage.

In accordance with the above-mentioned arrangement, because the entrance of the air gap is covered with the shield formed on the end face of the stator facing the air inlet passage, it becomes more difficult for the air introduced into the annular space via the air inlet passage to enter the air gap between the stator and the rotor, and it is possible to prevent any foreign matter from being trapped in this air gap, thereby damaging the stator and the rotor.

A large number of projections or channels inclined towards the circumferential direction may are formed on the outer periphery of the stator facing the entrance and the exit of the above-mentioned air gap so that the air flows generated by these projections or channels prevent air from entering the above-mentioned air gap.

In accordance with the above-mentioned arrangement, because a large number of projections or channels inclined towards the circumferential direction are formed on the outer periphery of the stator facing the entrance and the exit of the air gap, when air on the outer periphery of the stator is rotated by being dragged by the rotation of the rotor, air flows in directions flowing out of the entrance and exit of the air gap can be generated by the action of the above-mentioned inclined projections or channels so effectively preventing any foreign matter present in the air from entering the air gap.

The chain cover 26 in embodiments corresponds to the engine side wall of the present invention, and the magnet 34 in the embodiments corresponds to the rotor of the present invention.

BRIEF DESCRIPTION OF THE DRAWINGS

Practical modes of the present invention are described below by reference to the preferred embodiments of the present invention shown in the attached drawings.

FIGS. 1 to 4 illustrate a first embodiment of the present invention, where

DETAILED DESCRIPTION OF THE PREFERRED EMBODIMENTS

Figure 1:
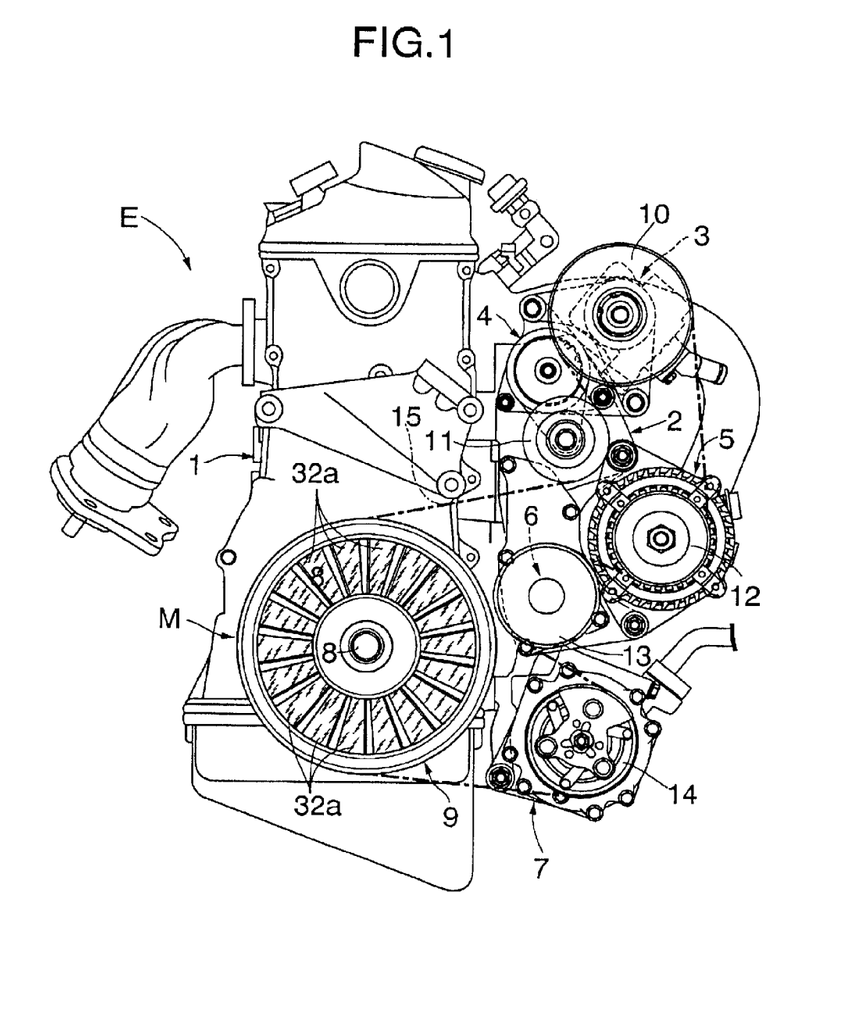
FIG. 1 is a front view of an in-line multi-cylinder engine along the axial direction of its crankshaft.

As shown in FIG. 1, an accessory attachment bracket 2 is fixed to a side face of an engine block 1 of an in-line multi-cylinder engine that is to be mounted in a vehicle, and an oil pump 3 for power steering, an auto tensioner 4, an alternator 5, a water pump 6 for cooling the engine and a compressor 7 for air conditioning are fixed to the above-mentioned accessory attachment bracket 2. A single endless belt 15 is wrapped around a crank pulley 9 provided on a shaft end of a crankshaft 8 of the engine E (the shaft end on the side opposite to the transmission), an oil pump pulley 10 is provided on the oil pump 3, a tensioner pulley 11 is provided on the auto tensioner 4, an alternator pulley 12 is provided on the alternator 5, a water pump pulley 13 is provided on the water pump 6 and a compressor pulley 14 provided on the compressor 7; the driving force of the crankshaft 8 is transmitted to the oil pump 3, the alternator 5, the water pump 6 and the compressor 7 via the endless belt 15 and tension is applied to the endless belt 15 by the auto tensioner 4.

The tensioner pulley 11 and the water pump pulley 13 are operated along the back surface of the endless belt 15. By employing the single endless belt 15 and using the back surface thereof as well, not only can the accessories 3 to 7 be disposed close to one another in a compact manner but also the accessories 3 to 7 can be effectively driven by ensuring that the endless belt 15 has a sufficient wrap angle around each of the pulleys 10 to 14.

Figure 2:
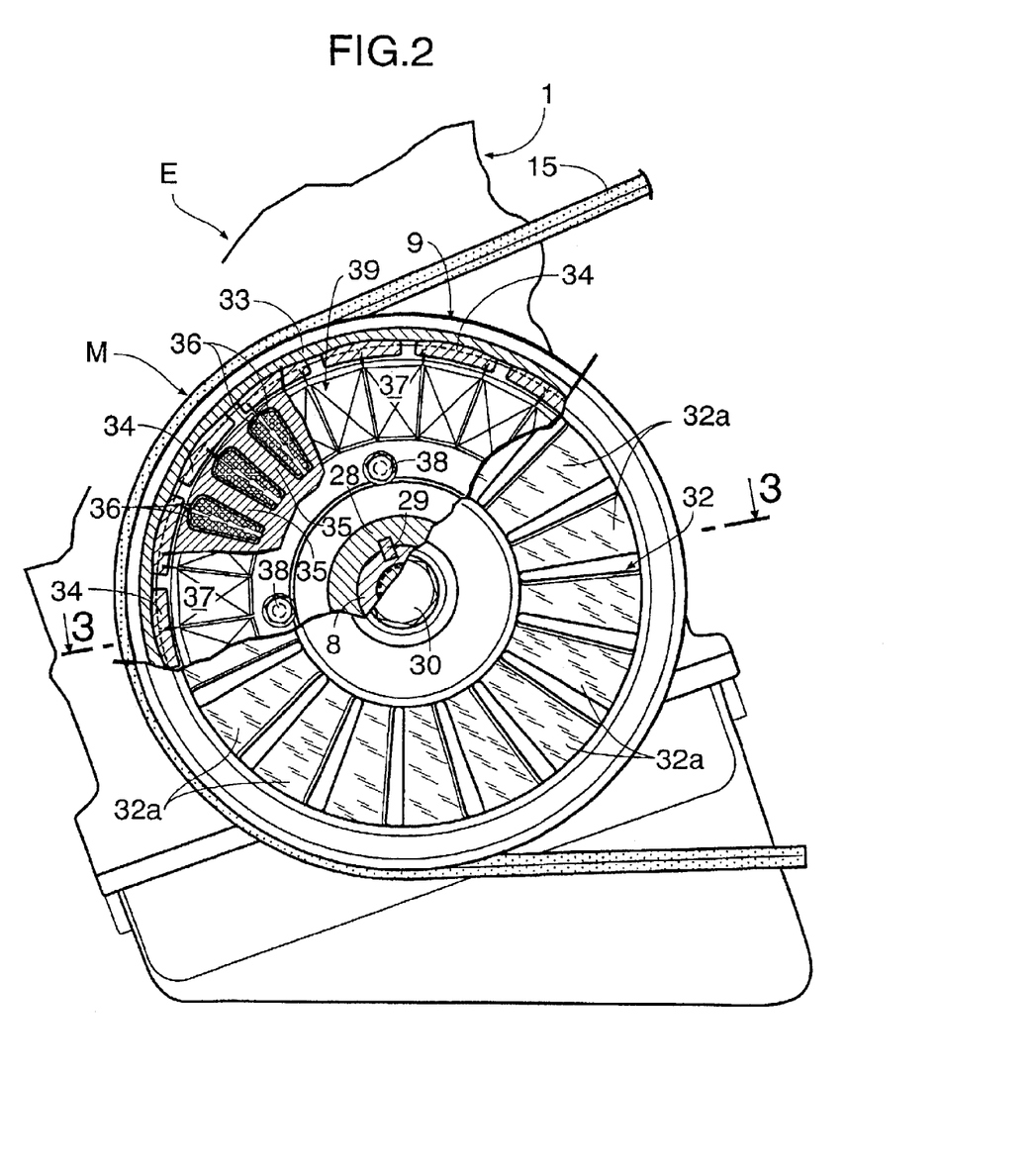
FIG. 2 is a magnified cross sectional view of an essential part of FIG. 1.
Figure 3:
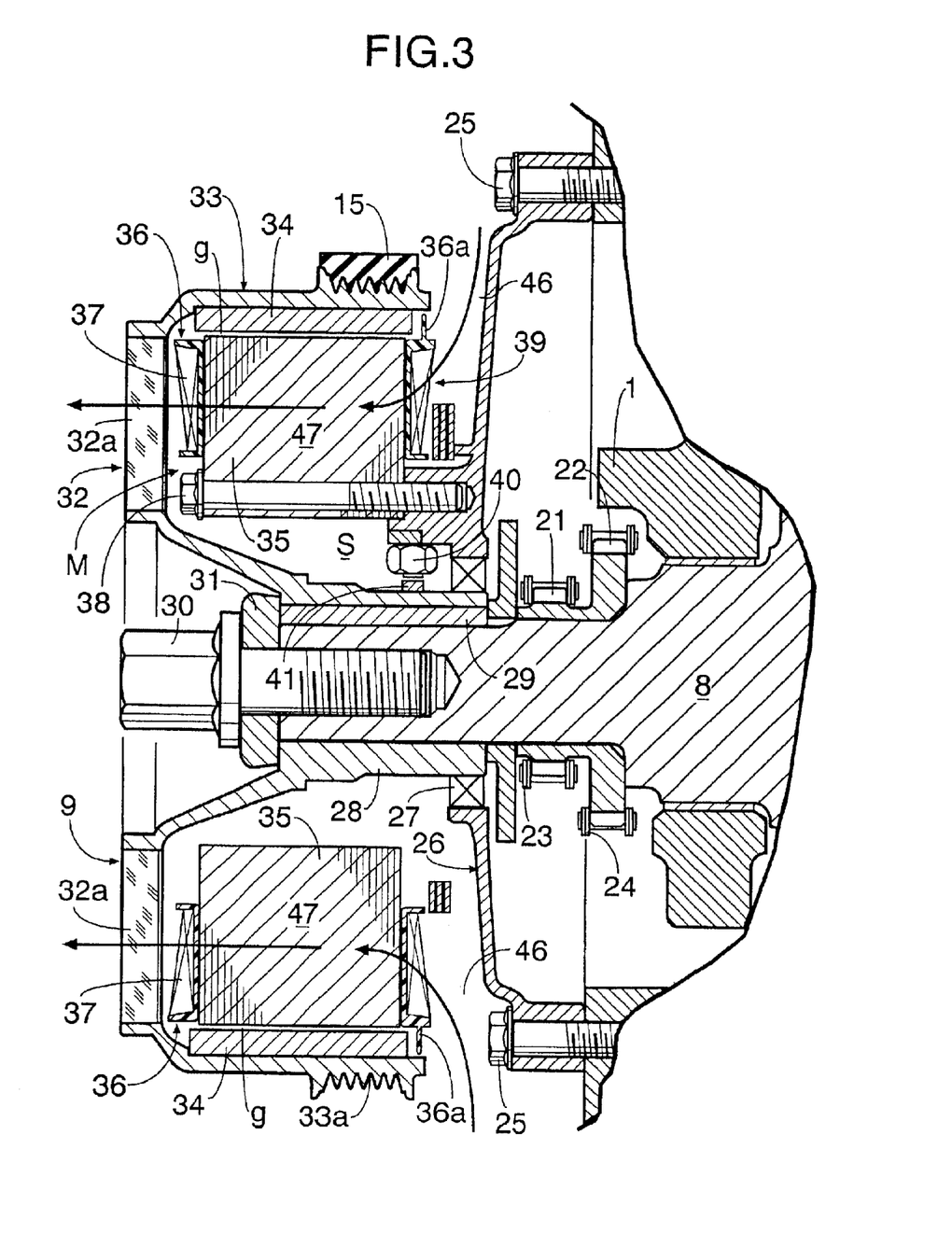
FIG. 3 is a cross sectional view taken along line 3—3 in FIG. 2.
Figure 4:
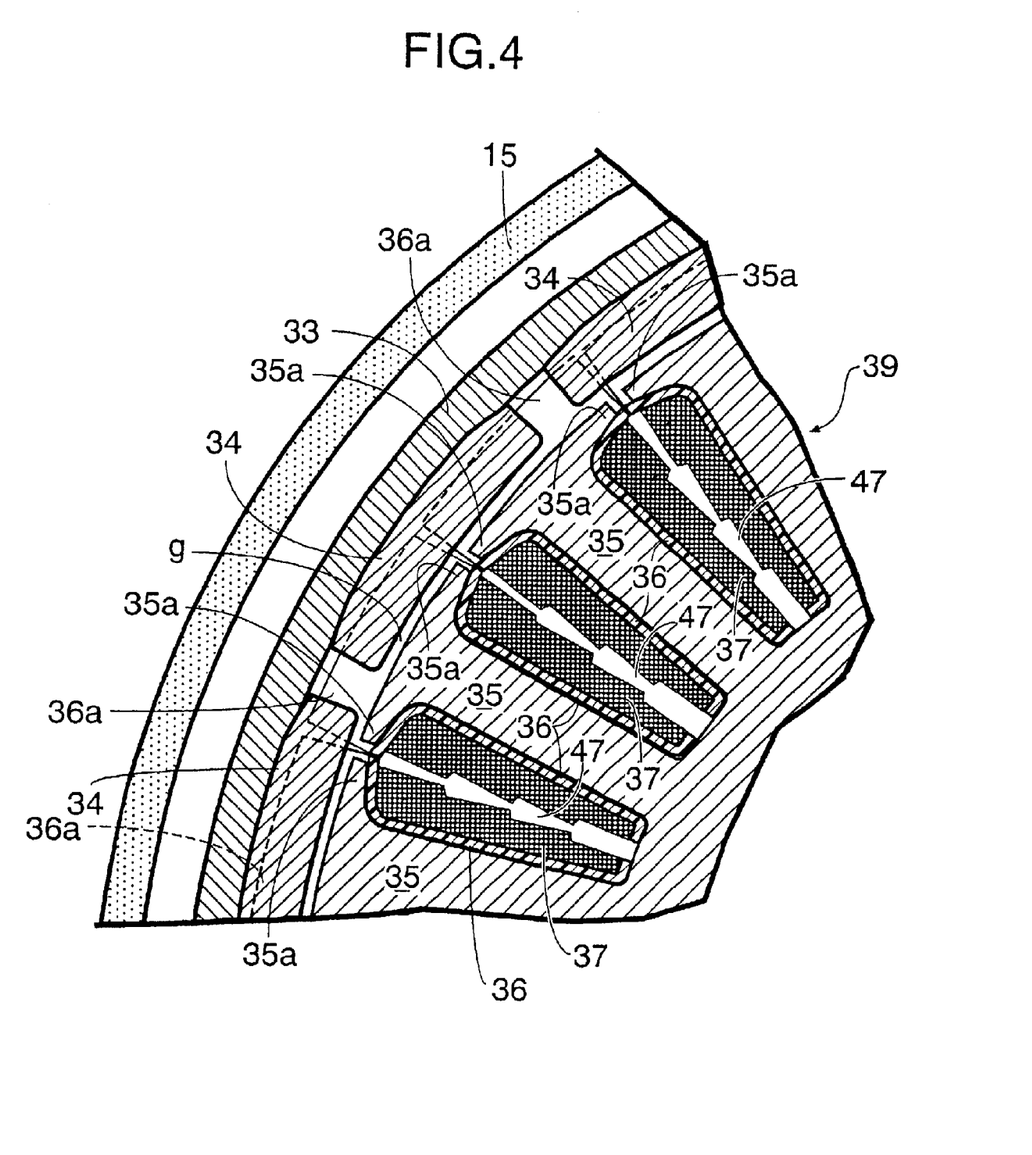
FIG. 4 is a magnified view of an essential part of FIG. 2.

As is clear from FIGS. 2 to 4, a camshaft drive sprocket 21 and a balancer shaft drive sprocket 22 which are formed integrally with each other are fixed to the crankshaft 8 which projects out of the engine block 1. An endless chain 23 wrapped around the camshaft drive sprocket 21 and an endless chain 24 wrapped around the balancer shaft drive sprocket 22 are covered with a chain cover 26 joined to the engine block 1 by means of bolts 25. The chain cover 26 forms an engine side wall of the present invention.

An end of the crankshaft 8 projecting out of the chain cover 26 through a sealing member 27 is fitted in a boss 28 of the crank pulley 9 via a key 29 and is prevented from falling out by means of a bolt 30 and a washer 31. An annular peripheral wall 33 is formed integrally with the outer edge of a side wall 32 which extends radially from the boss 28 of the crank pulley 9. A pulley channel 33a is formed on the outer surface of the peripheral wall 33, the endless belt 15 being engaged with the pulley channel 33a. An annular space S enclosed by the boss 28, the side wall 32, the peripheral wall 33 and the chain cover 26 is formed inside the crank pulley 9, and a motor/generator M is housed in this annular space S.

The motor/generator M comprises a plurality of magnets 34 fixed along the inner surface of the peripheral wall 33 of the crank pulley 9, and these magnets 34 form a rotor of the motor/generator M. A stator 39 comprising a plurality of cores 35 placed radially around the crankshaft 8 and a plurality of coils 37 wound around the cores 35 via bobbins 36 is fixed to the outer face of the chain cover 26 by means of a plurality of bolts 38. The outer periphery of the cores 35 faces the inner periphery of the magnets 34 across a small air gap g (see FIGS. 3 and 4).

A rotational rate sensor 40 fixed to the chain cover 26 faces a dog 41 that is to be detected, the dog 41 projecting from the outer periphery of the boss 28 of the crank pulley 9, and the rotational rate of the crankshaft 8 is detected based on pulse signals output from the rotational rate sensor 40 when the dog 41 that is to be detected passes the front face of the rotational rate sensor 41.

A plurality of cooling fan blades 32a (18 blades in this embodiment) are formed radially on the side wall 32 of the crank pulley 9, and these cooling fan blades 32a rotate together with the crankshaft 8. An annular air inlet passage 46 is formed between the chain cover 26 and the edge of the peripheral wall 33 of the crank pulley 9, the air inlet passage 46 providing communication between the outside of the crank pulley 9 and the annular space S. The entrance to the air gap g therefore faces the air inlet passage 46 and the exit of the air gap g faces the cooling fan blades 32a.

Shields 36a are formed from a part of each of the bobbins 36 and extend radially outwards so as to shield the entrance of the air gap g from the air inlet passage 46 (FIGS. 3 and 4). Moreover, each of the cores 35 has protrusions 35a (FIG. 4) extending in the circumferential direction on its radially outer end and, the protrusions 35a of adjacent cores 35 face each other with a very small clearance between them. The radially outer ends of the bobbins 36 extend along the protrusions 35a and meet each other in the region of the above-mentioned very small clearance. Moreover, air passages 47 for air circulation are formed between adjacent coils 37 (FIG. 4).

If the coils 37 of the motor/generator M are demagnetized, the crank pulley 9 functions simply as a pulley, but alternately exciting the coils 37 with a predetermined timing generates an attractive force and a repulsive force in turn in the magnets 34, thereby rotating the crank pulley 9 to crank the crankshaft 8, so that an engine which has stopped can be started. When the crankshaft 8 is rotated by a driving force transmitted back from the driven wheels to the engine E while the vehicle is being braked, the motor/generator M functions as a generator to produce a regenerative braking power.

Because the motor/generator M for starting the engine E is housed inside the crank pulley 9, any increase in size of the engine E or the transmission as a result of the attachment of the above-mentioned motor/generator M can be minimized, and the motor/generator M can be mounted in the engine compartment easily. Moreover, because the motor/generator M is housed in the annular space S formed inside the crank pulley 9, it can be protected from contamination and damage due to foreign matter being ingested.

When the coils 37 generate heat as a result of the operation of the motor/generator M, the coils 37 are cooled by air introduced into the inside of the crank pulley 9. That is to say, when the crank pulley 9 rotates together with the crank shaft 8, the cooling fan blades 32a formed on the side wall 32 of the crank pulley 9 rotate and air outside the crank pulley 9 is introduced into the annular space S via the air inlet passage 46. The air so introduced into the annular space S cools the coils 37 while passing through the air passages 47 formed between adjacent coils 37 and is discharged outside the crank pulley 9 by means of the cooling fan blades 32a.

Because the inside of the crank pulley 9 is forcibly ventilated by means of the cooling fan blades 32a rotating together with the crankshaft 8, the heated coils 37 can be cooled effectively to prevent degradation of their durability. Because the shields 36a formed on the bobbins 36 block the entrance of the air gap g and the protrusions 35a provided on the radially outer ends of the cores 35 are positioned close to each other to inhibit the circulation of air, it becomes more difficult for the air introduced into the annular space S via the air inlet passage 46 to enter the air gap g due to the obstruction presented by the shields 36a and the protrusions 35a. As a result, it becomes possible to effectively prevent any foreign matter present in the air from being trapped in the air gap g, which would cause damage.

Figure 5:
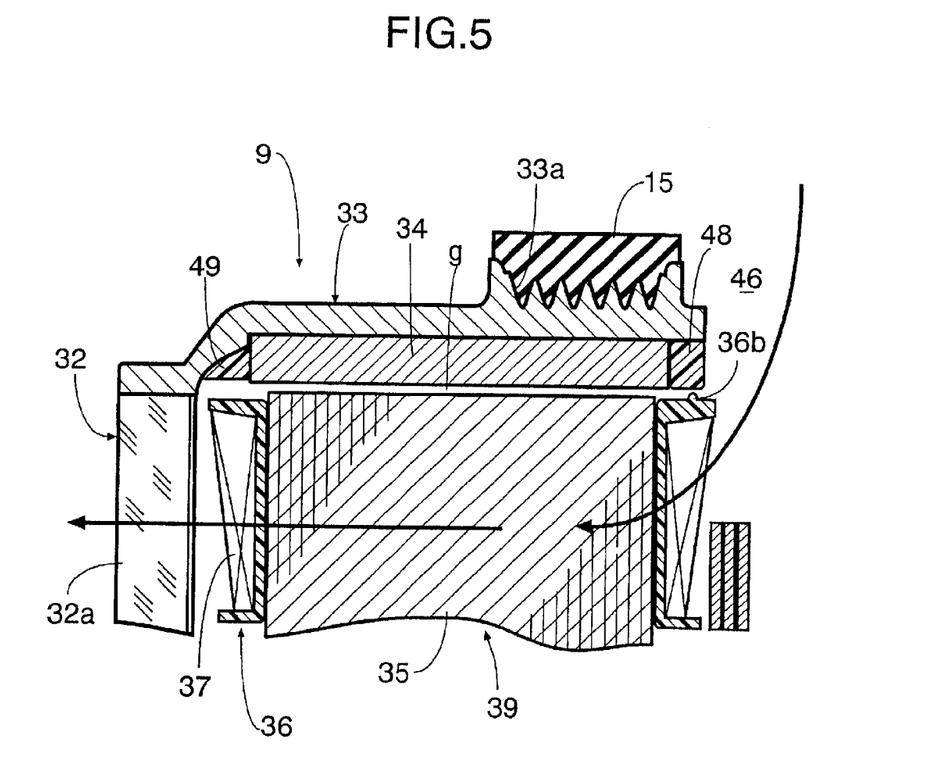
FIG. 5 is a magnified cross sectional view of an essential part of a motor/generator related to a second embodiment of the present invention.

A second embodiment of the present invention will now be explained with reference to FIG. 5.

In the first embodiment, it is possible to prevent any foreign matter from entering the air gap g by covering the entrance of the air gap g by means of the shields 36a formed on the bobbins 36, but in the second embodiment it is possible to prevent any foreign matter from entering the air gap g by means of an annular projection 36b formed on the outer periphery of the bobbins 36. That is to say, the magnets 34 are fixed to the inner face of the peripheral wall 33 of the crank pulley 9 by means of resins 48 and 49, and the annular projection 36b faces the inner periphery of the resin 48 on the entrance side of the air gap g with a small clearance therebetween so that any foreign matter is prevented from entering the air gap g.

Figure 6:
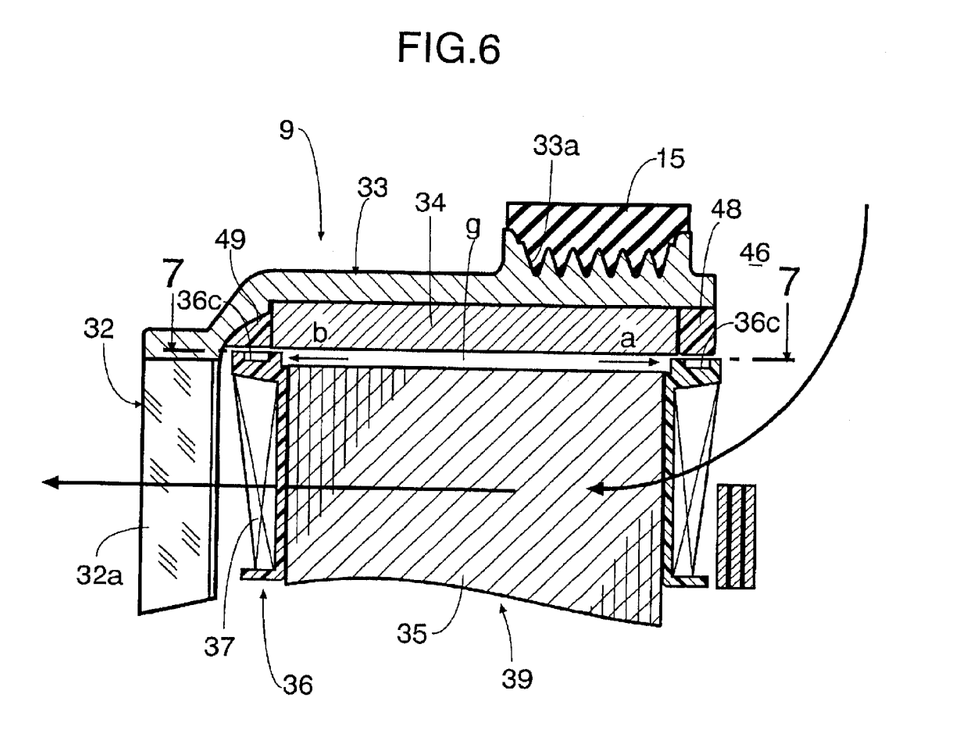
FIG. 6 is a magnified cross sectional view of an essential part of a motor/generator related to a third embodiment of the present invention.
Figure 7:
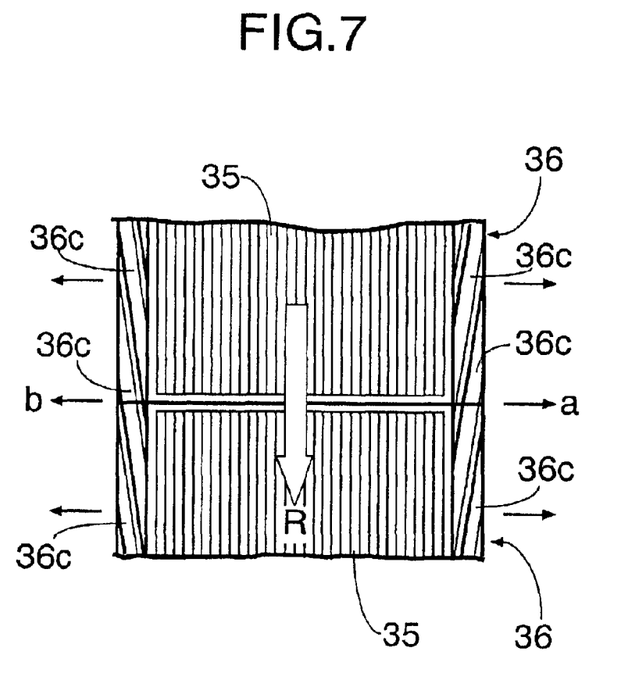
FIG. 7 is a cross sectional view taken along line 7—7 in FIG. 6.

A third embodiment of the present invention will now be explained with reference to FIGS. 6 and 7.

In the third embodiment, it is possible to prevent any foreign matter from entering the air gap g by expelling air through the entrance and exit of the air gap g. That is to say, a large number of channels 36c inclined towards the rotational direction of the crank pulley 9 shown by the arrow R in FIG. 7 are formed on the two edges in the axial direction of the outer periphery of the bobbins 36, these two edges facing the entrance and the exit respectively of the air gap g. Axially outward flows (the arrows a and b in FIGS. 6 and 7) are thereby caused in the air that is dragged by the rotation of the magnets 34, and these air flows prevent any foreign matter from entering the air gap g.

Embodiments of the present invention have been described in detail above, but the present invention can be modified in a variety of ways without departing from the spirit and scope of the invention.

For example, in the present embodiments the shields 36a, projections 36b and channels 36c are formed on the bobbins 36, but they can be formed on any part of the stator 39 (for example, the cores 35). A large number of projections inclined towards the direction of rotation of the crank pulley 9 may be formed instead of the channels 36c of the bobbins 36 in the third embodiment.

What is claimed is:

1. An outer rotor type motor/generator housed in an annular space defined between an engine side wall and a crank pulley fixed to one end of a crankshaft of an engine, said motor/generator comprising:

a stator supported on the engine side wall; and a rotor supported on an inner face of a peripheral wall of the crank pulley so as to face an outer periphery of the stator across an air gap, wherein an air inlet passage is formed between the engine side wall and an opposing edge of the peripheral wall of the crank pulley so as to provide communication between the annular space and the outside of the crank pulley, wherein cooling fan blades are provided on a side wall of the crank pulley facing away from said engine, said side wall of the crank pulley extending radially outwards from said one end of the crankshaft to the peripheral wall of the crank pulley, wherein air is introduced into the annular space via the air inlet passage to cool coils of the stator and the air is discharged to the outside from said cooling fan blades provided on said side wall facing away from said engine side wall by means of the cooling fan blades, wherein the stator comprises a plurality of cores and coils, the cores being positioned radially and each of the cores having a coil wound around it, the radial outer ends of each of the cores projecting in the circumferential direction so as to be close to each other and forming air passages between adjacent coils, air circulating through the air passages, and wherein a shield for covering the entrance to the air gap is formed on an end face of the stator facing the air inlet passage.

2. An outer rotor type motor/generator according claim 1, wherein a plurality of projections inclined towards the circumferential direction are formed on the outer periphery of the stator facing the entrance and the exit of the air gap so that the air flows generated by these projections prevent air from entering the air gap.

3. An outer rotor type motor/generator according to either claim 1, wherein a plurality of channels inclined towards the circumferential direction are formed on the outer periphery of the stator facing the entrance and the exit of the air gap so that the air flows generated by these channels prevent air from entering the air gap.

4. An outer rotor type motor/generator housed in an annular space defined between an engine side wall and a crank pulley fixed to one end of a crankshaft of an engine, said motor/generator comprising:

a stator supported on the engine side wall; and a rotor supported on an inner face of a peripheral wall of the crank pulley so as to face from a radially outer side an outer periphery of the stator across an axially extending air gap, wherein a radially extending air inlet passage is formed between the engine side wall and an opposing edge of the peripheral wall of the crank pulley so as to provide communication between the annular space and the outside of the crank pulley, wherein cooling fan blades are provided on a side wall of the crank pulley facing away from said engine, said side wall of the crank pulley extending radially outwards from said one end of the crankshaft to the peripheral wall of the crank pulley and axially facing said stator, wherein air is introduced into the annular space via the air inlet passage to cool coils of the stator and the air is discharged to the outside from said cooling fan blades provided on said side wall facing away from said engine side wall by means of the cooling fan blades, and wherein an air flow regulating means is provided at least at one axial end of the outer periphery of the stator for suppressing entry of air, that has been guided through the air inlet passage, into said air gap.

* * * * *